United States Patent [19]

Smith

[11] 3,991,281
[45] Nov. 9, 1976

[54] KEY TELEPHONE MONOBUS CONFERENCE ARRANGEMENT
[75] Inventor: Douglas Charles Smith, Locust, N.J.
[73] Assignee: Bell Telephone Laboratories, Incorporated, Murray Hill, N.J.
[22] Filed: May 23, 1975
[21] Appl. No.: 580,291

[52] U.S. Cl. .............................. 179/99; 179/1 CN
[51] Int. Cl.² ........................................ H04M 3/56
[58] Field of Search ............... 179/1 CN, 18 BC, 99, 179/170 R, 170 NC

[56] References Cited
UNITED STATES PATENTS

| | | | |
|---|---|---|---|
| 3,534,175 | 10/1970 | Schultz | 179/18 BC |
| 3,668,289 | 6/1972 | Fenton | 179/1 CN |
| 3,818,139 | 6/1974 | Snyder | 179/1 CN |
| 3,828,146 | 8/1974 | Lewis | 179/18 BC |
| 3,909,559 | 9/1975 | Taylor | 179/1 CN |

Primary Examiner—Kathleen H. Claffy
Assistant Examiner—Randall P. Myers
Attorney, Agent, or Firm—David H. Tannenbaum

[57] ABSTRACT

A monobus conference arrangement is disclosed for use in a key telephone system. A conference circuit is serially inserted on each line and is arranged with an impedance element common to all of the stations using the line. In addition, a monobus circuit replaces the conventional hybrid in each station set. To avoid the problem of having more than one such impedance element connected in a multiline conference, the system is arranged so that current flows in a first direction through the conference circuit associated with the first-connected line and in a reverse direction through subsequently connected line conference circuits. Under control of the reverse current flow, the common impedance elements associated with the reverse current line conference circuits are removed from the connection.

4 Claims, 3 Drawing Figures

KEY TELEPHONE MONOBUS CONFERENCE ARRANGEMENT

FIELD OF THE INVENTION

This invention relates to key telephone systems and, more particularly, to conference control arrangements for use in such systems.

BACKGROUND OF THE INVENTION

This patent application is an extension of the high impedance monobus technique disclosed in the concurrently filed, copending patent application of D. J. Morgan and D. C. Smith, Ser. No. 580,292 filed May 23, 1975, to provide lossless multiline and multistation conferencing in a key telephone system. In such a key telephone system, in order to utilize the existing system structure it is necessary to provide a conference circuit interposed between each key telephone line circuit and the associated stations and to replace the conventional hybrid in the stations with a similar conference circuit for the purpose of converting from two-wire operation to monobus operation. The monobus arrangement utilized an impedance element with is common to all of the stations connected to the conference. The purpose of the monobus technique is to reduce the transmission loss which results when several stations or lines are connected together in conference fashion.

Since in key telephone systems there is no common circuitry available other than the line circuits, it is necessary to equip each line conference circuit with the common monobus impedance element. When more than one line becomes connected to the conference, the impedance elements associated with each line become connected in parallel thereby changing the voltage signals on the bus. In addition to affecting the transmission levels of the system, such a change in voltage defeats the feedback concellation inherent in the monobus technique. Thus, a need exists in the art for a control arrangement designed to prevent more than one such monobus impedance element from becoming connected to the same conference.

SUMMARY OF THE INVENTION

Such a need has been met in a illustrative embodiment of my invention where a current direction detection circuit is built into each line conference circuit. The system is designed so that current flows in one direction through the line conference circuit associated with the first-connected line and in the reverse direction through subsequently connected line conference circuits. The monobus impedance elements associated with the reverse current line conference circuits are removed from the connection under control of the reverse current.

Accordingly, it is a feature of my invention to prevent the concurrent connection to a common line of more than one line control element by controlling the direction of current flow through each connected element.

It is a still further feature of my invention to control the establishment of key telephone conference connections by detecting the direction of current flow on the conference connection.

DESCRIPTION OF THE DRAWING

These and other objects and features of my invention will become more apparent from an understanding of the drawing in which.

DETAILED DESCRIPTION

Key Telephone Operation

Figure 1:
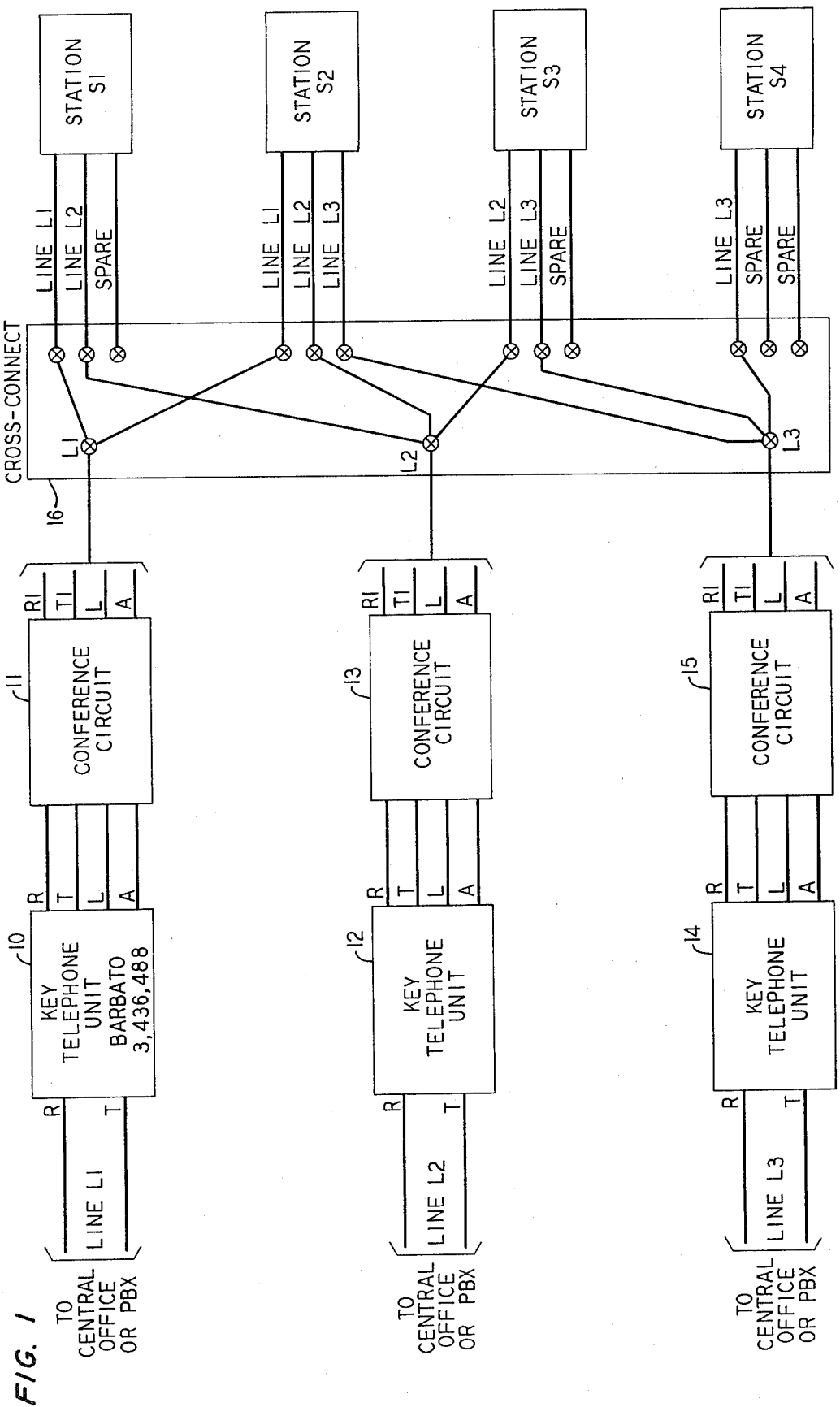
FIG. 1 shows a block diagram of a key telephone system with the conference circuit inserted between the line circuit and the stations.

Before beginning the detailed description, it will be helpful to the understanding of my invention if we first review the basic operation of a key telephone system. Accordingly, with reference to FIG. 1, an incoming call on line L1 is detected by key telephone unit 10 which unit operates, as described in U.S. Pat. No. 3,436,488, issued to R. E. Barbato et al. on Apr. 1, 1969, to provide lamp flash and ringing signals on the L lead. The signals are transmitted through conference circuit 11 and via cross-connect field 16 to each of the stations, such as stations S1 and S2, associated therewith. When either station S1 or station S2 goes off-hook in response thereto, a signal is provided over the A lead which signal is detected by key telephone unit 10 causing that unit to remove the flashing lamp signal and to substitute therefore a steady lamp signal. At the same time the key telephone unit operates to allow transmission between line L1 and the off-hook station. This operation is more fully detailed in the above-mentioned Barbato et al. patent.

In response to an outgoing call originated from one of the stations, such as, for example, station S1, the key telephone unit associated therewith operates as described in the above-mentioned Barbato et al patent to establish a connection from the off-hook station to the associated central office or PBX line. Thus, when station S1 goes off-hook and the pickup key associated with line L1 is operated, key telephone unit 10 operates to establish a communication connection from line L1 via cross-connect field 16 to station S1. Station S2 can be connected to the established connection simply by going off-hook and operating the pickup key associated with line L1.

Typically, key telephone systems are arranged with interconnected pickup keys such that only one key at a time may be operated and the operation of any other key will cause any priorly operated key to become released. This releasing operation is usually accomplished by a mechanical interlock between the pickup keys and by removing the interlock it is possible to operate more than one key at a particular station. In the discussion which follows it will be assumed that at any one station more than one such pickup key may be operated concurrently. Thus, station S1 may be connected concurrently to line L1, key telephone unit 10 and to line L2, key telephone unit 12. Under such a condition, both conference circuit 11 and conference circuit 13 would be connected into the conference. As will be discussed in more detail hereinafter, these conference circuits each contain an impedance element which, without further control, would be added into the connection thereby affecting the transmission on the conference. Thus, it is important to remove one of these impedance elements on multiline connections. The technique for removing one of these elements will be detailed hereinafter.

Monobus Technique

As discussed in the above-mentioned Morgan-Smith patent application, a common impedance element is used to control transmission signals between connected stations. Basically, the monobus technique utilizes a high impedance current source arranged to provide the current equivalent of the voltage signal available from the transmission source. The common impedance is a summing impedance and is shared in common by all parties connected to the conference. In the conference circuit shown in FIG. 2, this summing impedance for one wire consists of resistor-inductor combination 2R14 and 2L1 and, for the other wire, resistor-inductor combination 2R15 and 2l2.

Assume now that a connection has been established between line L1 and station S1 via conference circuit 11. (The control of such a connection will be detailed hereinafter.) Under such an assumed condition, transmission signals are present on leads R and T, FIG. 2, from the key telephone unit. These transmission signals are communicated to station S1 over leads R1 and T1 in the manner detailed in the above mentioned Morgan-Smith patent application for balanced transmission. This operation will now be briefly reviewed.

In response to signal transmission voltage over the T and R leads from the key telephone unit, conference circuit 11 transmits signals to leads R1 and T1, which leads are the equivalent of the bus leads shown in the Morgan-Smith patent application, as a signal current from the current source comprised of transistors 2Q1, 2Q2 and from the current source comprised of transistors 2Q3 and 2Q4. These current sources produce a resultant signal voltage, shown as voltage es for lead R1 across common impedance 2R14, 2L1 and as voltge es1 for lead T1 across common impedance 2R15, 2L2.

In each conference circuit, amplifier 2A1-1 subtracts the conference circuit's own contribution to the bus signal and applies the amplified result to the telephone line leads R and T through impedance 2Z1 and transformer 2I1. Operational amplifier 2A1-2 along with associated components 2Z1. 2R2 and 2R7 constitute an electronic hybrid of the type disclosed in U.S. Pat. No. 3,824,344 issued to Dennis B. James and James R. McEowen on July 16,1974. This hybrid separates the directions of transmission from the telephone set into two separate paths, i.e., the transmit path from the output of amplifier 2A1-2 and the receive path from the output of amplifier 2A1-1.

The purpose of the conference circuit is to recombine the two transmission paths onto a single wire for unbalanced transmission and onto two wires for balanced transmission while at the same time maintaining 4-wire transmission, i.e., separate and distinguishable channels for received and transmitted signals. This is accomplished by separating the directions of transmission as voltage signals or current signals on the same wire.

Transmission to and from Line L1

Operational amplifier A1-1 and associated components 2R3, 2R4, 2C2, 2C3, 2R5, 2R6, 2R12 and 2R13 form the voltage amplifier for the receive path from the telephone station. This amplifier senses the bus signal voltages es and es1, which are of opposite polarity, and delivers the differential signal to line L1. Resistor 2R6 serves to cancel out the circuit's own contribution to signal es, while resistor 2R12 serves to cancel out the circuit's own contribution to signal es 1. Resistors 2R5 and 2R13 are connected from the bus to the equipotential input nodes of amplifier 2A1-1 and thus the impedance seen looking into the conference circuit not including the common impedance 2R14-2L1 from station S1, lead R1, is resistor 2R5 is parallel with the composite collector impedance of transistors 2Q1 and 2Q2. From lead T1 the impedance seen looking into the conference circuit not including 2R15-2L2 is resistor 2R13 in parallel with the composite collector impedance of transistors 2Q3 and 2Q4. These impedances are approximately equal to the value of resistors 2R5 and 2R13. Since resistors 2R5 and 2R13 are much higher impedance than the common impedances 2R14-2L1 and 2R15-2L2, the impedance seen looking into T1 and R1 is either high (2R5 or 2R13) or low (2R14-2L1 or 2R15-2L2) depending if diodes 2D1 and 2D2 are conducting or not. Control will be covered in more detail later.

DC Voltage Protection

Capacitors 2C2 and 2C3 break the dc feedback loop in the conference circuit, insuring low frequency stability and a low offset voltage in amplifier 2A1-1. Capacitors 2C2 and 2C3 also prevent such dc voltage from saturating amplifier 2A1-1.

Balanced Conference Operation

Amplifier 2A1-3 and resistors 2R8 and 2R10 have been added to produce a signal out of phase with the signal from amplifier 2A1-2. This out-of-phase signal is applied to transistors 2Q3 and 2Q4 and resistor 2R11, which act as the signal current source for the second path, lead T1, of the balanced bus pair. Resistors 2R12 and 2R13 and capacitor 2C3 are added to amplifier 2A1-1 to convert it to a balanced input amplifier. Under such an arrangement, the circuit is sensitive only to the differential signal between leads T1 and R1. Common mode signals which are in phase with each other, such as induced noise, are rejected by the balanced amplifier 2A1-1, thereby providing a circuit which gives high crosstalk and noise protection.

Communication to and from Station S1

Figure 3:
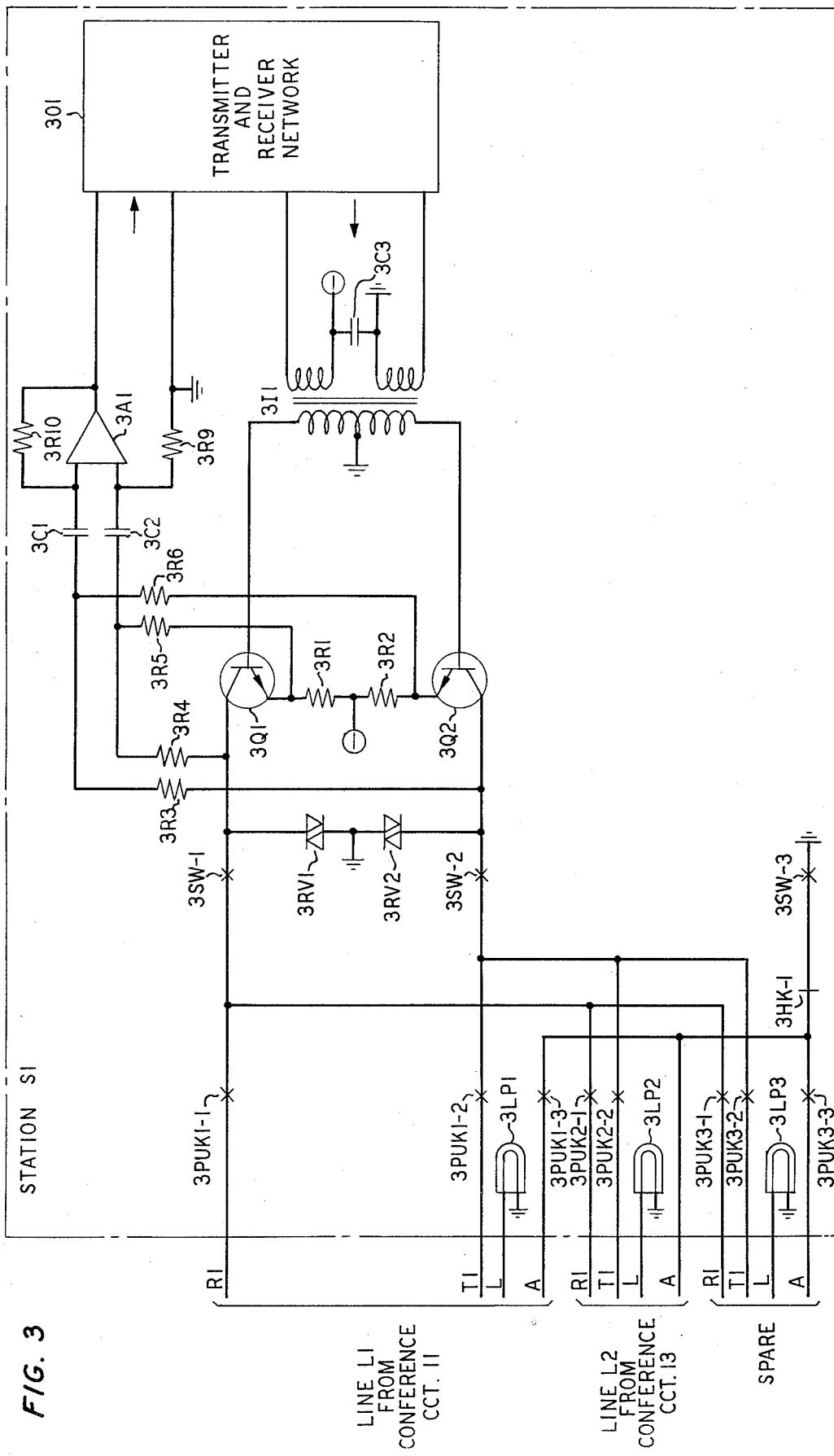
FIG. 3 shows a detailed schematic of the station circuit.

Turning now to FIG. 3, communication from the T1 and R1 leads from conference circuit 11 is supplied via resistors 3R3 and 3R4 and capacitors 3C1 and 3C2 and via amplifier 3A1 and associated resistors 3R10 and 3R9 to transmitter and receiver 3O1. Transmission from 3O1 is supplied via transformer 3I1 to the bases of transistors 3Q1 and 3Q2 and via these transistors to leads R1 and T1 to conference circuit 11. Resistors 3R5 and 3R6 are used to remove from the returned signal, in the manner previously discussed, any portion of the transmission signal generated at the same station. The value of resistors 3R5 and 3R6 may be altered slightly to provide a slight feedback for side tone.

As additional stations are added to the conference, the respective T1 and R1 leads are added in parallel with the T1 and R1 leads at any priorly connected station. Each such additional station becomes connected to conference circuit 11 and shares the inductances 2R14-2L1 and 2R15-2L2 (2D1 and 2D2 conducting) in common with all stations connected to the same conference. Such a conference would experience very little, if any, signal loss.

Stability of Conference

The stability of large conferences can be improved by adjusting the ratio of resistors 3R3, 3R4, 2R5 and 2R13 to impedances 2R14-2L1 and 2R15-2L2. By lowering this ratio the bus is loaded down in a controlled manner as new ports are added to a conference, by the paralleling of these resistors with the respective impedances, thereby giving a lower effective value of impedance. This lowers the ac gain and injects negative feedback in increments as more stations are added to the conference.

Operation of the Conference Control Circuit

Figure 2:
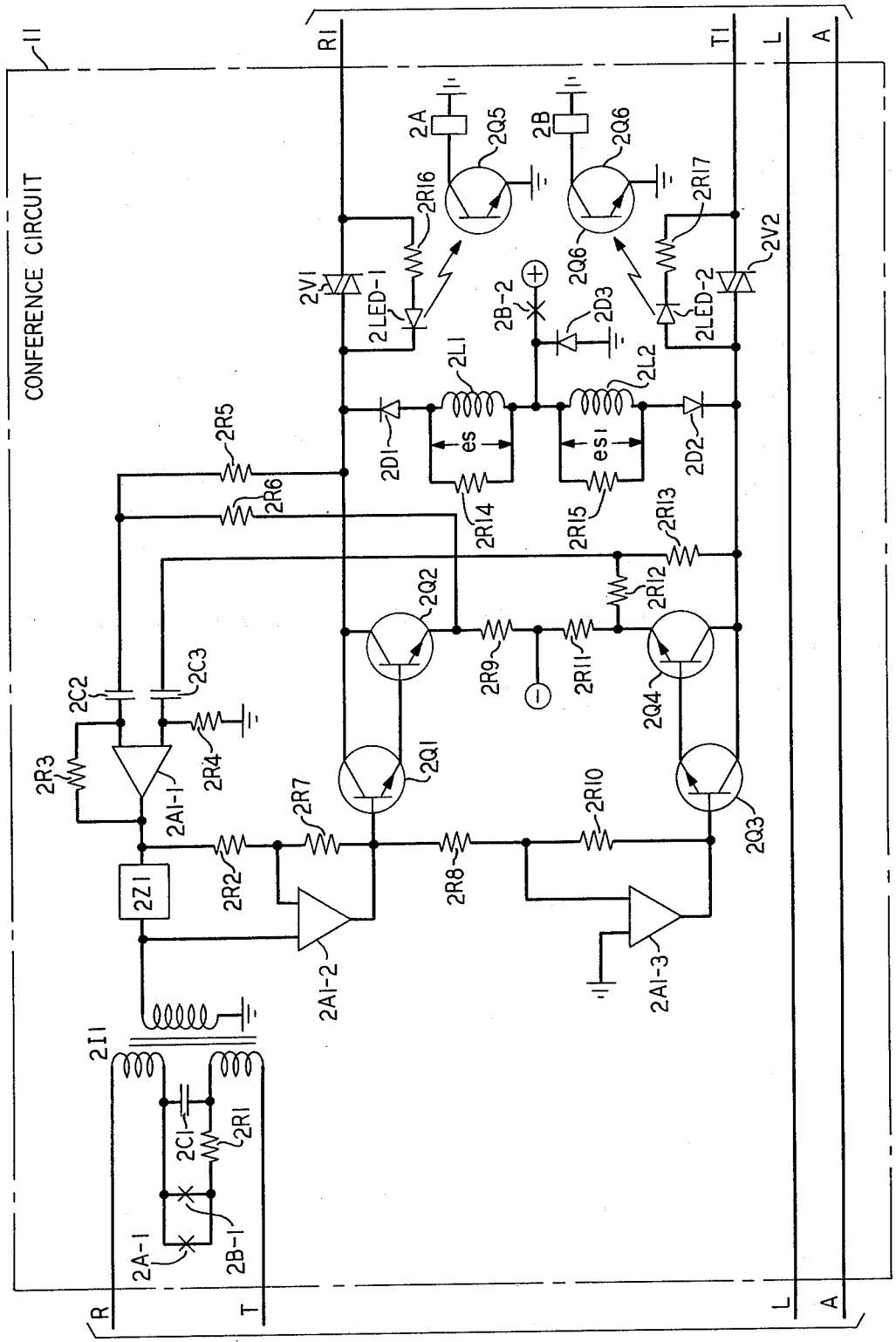
FIG. 2 shows a detailed schematic of the conference circuit.

Continuing in FIG. 3, station S1 becomes connected to line L1 by going off-hook and operating the pickup key associated with line L1. Accordingly, ground is supplied via enabled make switchhook contact 3SW-3, released hold break contact 3HK-1 and enabled pickup key contact 3PUK1-3 over lead A to FIG. 2 through conference circuit 11 to key telephone unit 10, as shown in FIG. 1. At the same time, as shown in FIG. 3, the collector of transistor 3Q1 is connected via enabled switchhook contact 3SW-1 and enabled pickup key contact 3PUK1-1 to lead R1, while the collector of transistor 3Q2 is connected via enabled make switchhook contact 3SW-2 and enabled make pickup key contact 3PUK1-2 to lead T1. At this time negative potential is on leads R1 and T1 via resistors 3R1 and 3R2 and transistors 3Q1 and 3Q2. Leads R1 and T1 are connected to conference circuit 11 as shown in FIG. 2.

Returning now to FIG. 2, because the potential on leads R1 and T1 from station S1 is more negative than ground, current flows through diode 2D3 and via resistor and inductor combination 2R15-2L2, diode 2D2, light-emitting diode 2LED-2 and resistor 2R17 in parallel with varistor 2V2 to lead T1. Current also flows through diode 2D3 and via resistor and inductor combination 2R14-2L1, diode 2D1, varistor 2V1 to lead R1. Current also flows through diode 2D1 to negative potential via transistor 2Q2 and resistor 2R9 and through diode 2D2 to negative potential via transistor 2Q4 and resistor 2R11.

Current flowing from the conference circuit to the connected station passes through light-emitting diode 2LED-2 causing transistor 2Q6 to turn on, operating relay 2B. Relay 2A remains unoperated since light-emitting diode 2LED-2 is back biased. Relay 2B operating provides a source of positive potential via enabled make contact 2B-2 to leads T1 and R1, thereby maintaining dc current flow from the conference circuit to the connected station. the operation of relay 2B also connects leads R and T from the key telephone unit to transformer 2I1 so that communication is possible from central office or PBX line L1 shown on FIG. 1 via key telephone unit 10 to and through conference circuit 11 to connected station S1. In this situation, conference circuit 11 operates in the manner previously described with resistor and inductor combinations 2R14-2L1 and 2R15-2L2 being the common impedance elements which control communication.

Connection of Additional Stations to the Conference

In the event that any other station, for example station S2, wishes to become connected to the established conference on line L1, the pickup key associated with line L1 at that station would be operated. Under such a condition, the R1 and T1 leads from the subsequently added station would be connected in parallel across the R1 and T1 leads of conference circuit 11. Thus, since positive potential via enabled make contact 2B-2 in conference circuit 11 is on leads R1 and T1, current flows out from conference circuit 11 and into the subsequently connected station S2 and through transistors 3Q1 and 3Q2 to a source of battery therein. As discussed above, using the monobus technique described, several stations may be added to the conference without degrading telephone communications.

Establishment of a Multiline Conference

In the event that it is desired to connect line L2 to the established conference, one of the stations connected to the conference, for example station S1, would operate the pickup key associated with line L2. Since, as discussed above, more than one pickup key may be operated concurrently, the operation of the line L2 pickup key would cause a connection to be established from station S1 and the collectors of transistors 3Q1 and 3Q2 via enabled switchhook contacts 3SW-1 and 3SW-2 and via now enabled pickup key contacts 3PUK2-1 and 3PUK2-2 to the R1 and T1 leads. These leads are extended to conference circuit 13, which conference circuit is not detailed but is the same as conference circuit 11 shown in FIG. 2.

It will be recalled that positive potential is on leads R1 and T1 from conference circuit 11 and station S1. this positive potential is extended over the path just described to leads R1 and T1 of conference circuit 13. When this positive potential is placed on leads R1 and T1 of conference circuit 13, current will flow from the R1 and T1 leads into conference circuit 13 and, as detailed in FIG. 2, will flow via resistor 2R16 and light-emitting diode 2LED-1 in parallel with varistor 2V1 to the collector of transistor 2Q2 and via lead T1 and varistor 2V2 to the collector of transistor 2Q4. Diode 2D1 and diode 2D2 prevent this current, which is flowing into conference circuit 13 from the connected stations, from passing through resistor and inductor combinations 2R14-2L1 and 2R15-2L2, thereby inhibiting those impedances from passing current. Thus current flowing into conference circuit 13 operates to prevent the common impedances from becoming connected in parallel on the conference connection. However, since, with respect to conference circuit 11 also connected to the conference at this time, current is flowing out of the circuit, the common impedances associated with conference circuit 11 are maintained in the circuit. Thus one, and only one common impedance is connected to the conference even though more than one conference circuit is involved in the communication connection. Accordingly, the output current from the current source, transistors 2Q1, 2Q2, 2Q3 and 2Q4, of conference circuit 13, as well as the current sources of conference circuit 11 and all stations on the conference, are provided to the common impedance of conference circuit 11 and a single resultant voltage is produced which is supplied to all connected stations and to all connected lines.

Current flowing into conference circuit 13 and through light-emitting diode 2LED-1 turns on transistor 2Q5 turning on relay 2A, thereby establishing a communication connection from conference circuit 13 via leads R and T and transformer 2I1 to key telephone unit 12 and line L2 shown in FIG. 1.

Conclusion

Although the use of the monobus technique is shown in a key telephone system where the direction of current is used to control the connection of the common impedance element to the circuit, it will be understood that such a technique can be utilized to advantage in several types of communication systems other than key telephone systems.

What is claimed is:

1. A conference circuit for use in controlling communication connections between a number of telephone lines and a number of telephone stations, one said conference circuit uniquely associated with each said line and interposed between said line and any connected station, and each said conference circuit comprising
    a common impedance element,
    a first circuit signal means operable for communicating to said common impedance element current signals representative of input voltage signals from said associated line,
    means including said common impedance element for converting any communicated current signals into voltage signals,
    means for communicating said converted voltage signals to all connected telephone stations,
    means for determining whether said conference circuit is a first-connected conference circuit or a subsequently connected conference circuit, and
    means controlled by said determining means in a determined subsequently connected conference circuit for inhibiting said converting of said communicated current signals into voltage signals in said subsequently connected conference circuit, and for communicating said communicated current signals to a first-connected conference circuit.

2. The invention set forth in claim 1 wherein said determining means is a direct current direction detection circuit.

3. The invention set forth in claim 2 wherein said direct current direction detection circuit includes means for establishing a first direction of direct current flow from a first-connected conference circuit to any connected stations and to any subsequently connected conference circuits and for establishing a second direction of direct current flow from said first-connected conference circuit to said subsequently connected conference circuits.

4. In a key telephone system where communication connections are enabled from any number of telephone lines to any number of telephone stations under control of enabled pickup keys at said telephone stations, each said pickup key being uniquely associated with one of said lines and with a line circuit associated with said line, said system arranged to connect together any number of said stations and said lines, the improvement comprising a conference circuit associated with each said line circuit, each said conference circuit comprising
    a common impedance element,
    a first circuit signal means operable for communicating to said common impedance element current signals representative of input voltage signals from said associated line,
    means including said common impedance element for converting any communicated current signals into voltage signals,
    means including said common impedance element for supplying said converted voltage signals to any said connected telephone station and to any subsequently connected conference circuits associated with other lines,
    means for determining whether said conference circuit is a first-connected conference circuit or a subsequently connected conference circuit,
    means enabled by said determining means in a determined subsequently connected conference circuit for inhibiting said conversion of said communicated current signals into voltage signals, and
    means enabled by said determining means in a determined subsequently connected conference circuit for communicating said connunicated current signals to said common impedance element in a first connected conference circuit.

* * * * *